UNITED STATES PATENT OFFICE.

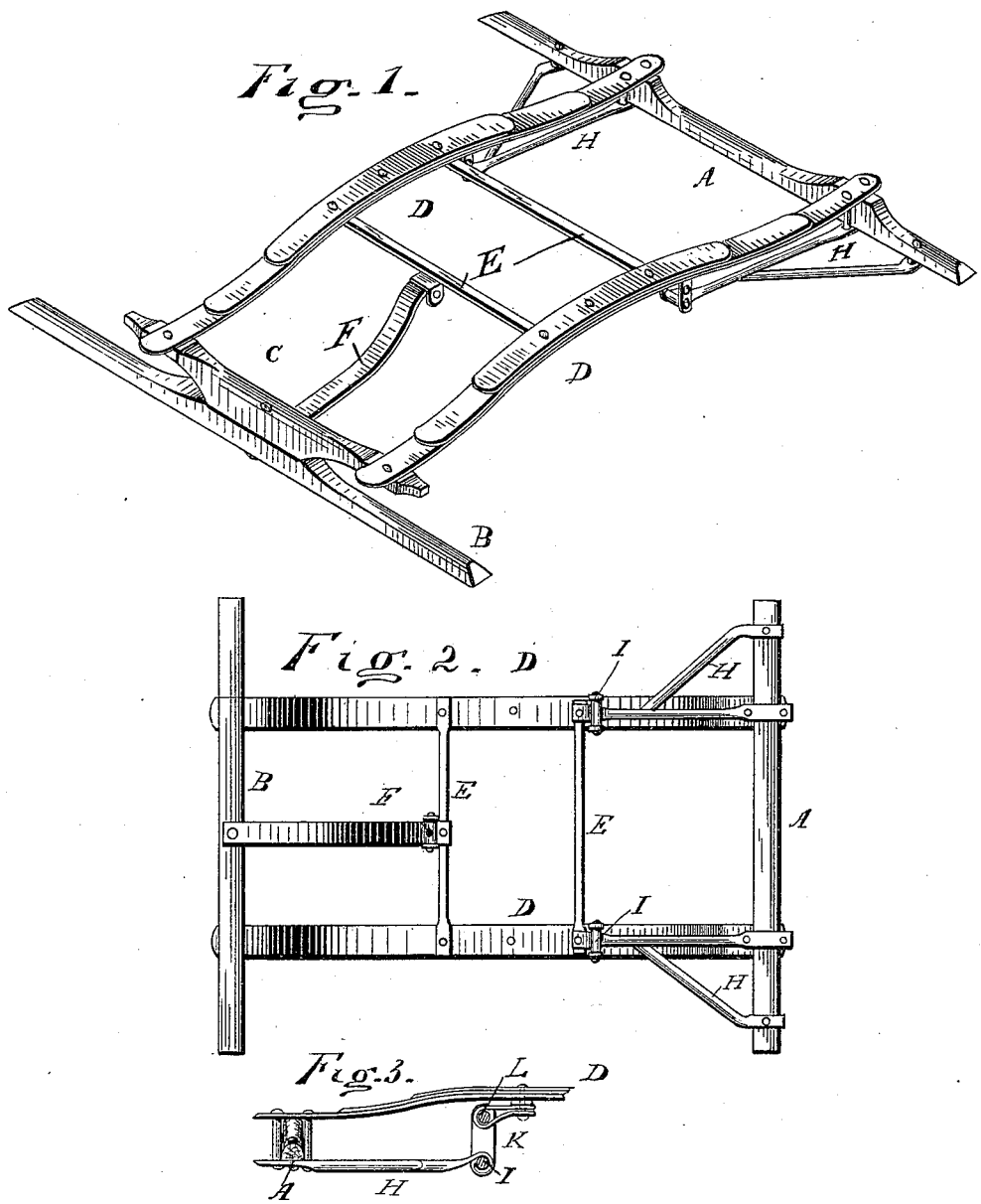

LOUIS I. HATFIELD AND EDWIN A. CHUBB, OF CORTLAND, NEW YORK, ASSIGNORS OF ONE-HALF TO HJALMAR MALMBERG AND HORACE ROBBINS, OF SAME PLACE.

CARRIAGE-SPRING.

SPECIFICATION forming part of Letters Patent No. 420,905, dated February 4, 1890.

Application filed November 25, 1889. Serial No. 331,447. (No model.)

*To all whom it may concern:*

Be it known that we, LOUIS I. HATFIELD and EDWIN A. CHUBB, residing at Cortland, in the county of Cortland and State of New York, have invented certain new and useful Improvements in Carriage-Springs, of which the following is a specification, reference being had therein to the accompanying drawings.

This invention relates to springs for carriages.

The object of our invention is to produce a spring-support for a carriage-body of the kind known as "side springs," in which the springs shall be directly connected to the rear axle and to the front bolster of the carriage, and shall be supported against undue movement while permitted to yield under all ordinary circumstances.

In the drawings, Figure 1 is a perspective view of the carriage axles and springs. Fig. 2 is a bottom plan of the same. Fig. 3 is a broken section of the rear axle, part of a spring, and the spring support or brace.

A indicates the rear axle, and B the front axle, of the vehicle. The axles are of any usual or approved construction.

C indicates the front bolster.

D D denote side springs, which extend from the rear axle to the front bolster. These springs are bolted or otherwise securely connected to the axle and bolster and rise high enough in the middle to support the carriage-body with such elasticity as is needed. The springs may be composed of a suitable number of leaves.

Two cross-bars E E connect the springs between the axle and the bolster and secure stiffness to the structure. A spring-brace F extends back from the middle of the front axle, to which said spring is rigidly secured, and the rear end of said spring F is pivotally connected with the front cross-bar E.

A brace H is rigidly secured to the bottom of the rear axle under each spring D. The braces H extend forward under the springs for perhaps one-third the length of said springs. The front ends of these braces H are supplied with eyes I I. A link K couples the eye I of each brace to a loop L on the spring D by suitable pivots. This loop serves as a support from the front end of the brace H to the spring, but not an unyielding support.

When weight is applied to the springs, the depression of said springs tends to rock the axle in the wheels. The brace H and link K constitute with the springs a kind of truss, giving a certain support to the springs, but not preventing the yielding of said springs. The front spring-brace F also serves to truss the front of the vehicle.

The front and rear braces together give great rigidity against side strains.

What we claim is—

1. The combination of the rear axle, the side springs connected thereto, a pair of braces extending forward from the rear axle, and pivoted links connecting these braces and the springs, all substantially as described.

2. The combination of the rear axle, front bolster, side springs connecting the two, a pair of cross-bars connecting the springs, a brace extending from the front axle to the front cross-bar, and a pair of braces from the rear axle having link-connections to the springs, all substantially as described.

In testimony whereof we affix our signatures in presence of two witnesses.

LOUIS I. HATFIELD.
EDWIN A. CHUBB.

Witnesses:
JAMES R. SCHERMERHORN,
GEORGE J. MAYCUMBER.